United States Patent [19]
Poling

[11] Patent Number: 5,893,626
[45] Date of Patent: Apr. 13, 1999

[54] SAFETY LIGHT WITH COLORFUL ROTATING ILLUMINATION PATTERN

[76] Inventor: Thurman Quentin Poling, 1489-77th Ave. N., St. Petersburg, Fla. 33702

[21] Appl. No.: 08/042,888

[22] Filed: Apr. 5, 1993

[51] Int. Cl.$^6$ ............................................. F21V 33/00
[52] U.S. Cl. .................. 362/35; 362/231; 362/232; 362/242
[58] Field of Search .................. 362/35, 72, 230, 362/231, 232, 234, 235, 236, 240, 242, 249, 251, 806, 811; 40/442, 444; 340/432

[56] References Cited

U.S. PATENT DOCUMENTS

| | | | |
|---|---|---|---|
| 926,956 | 7/1909 | McComb | 40/442 |
| 2,478,908 | 8/1949 | Edgerton | 362/35 |
| 2,511,893 | 6/1950 | Alden . | |
| 2,515,236 | 7/1950 | Kunins | 362/231 |
| 2,612,548 | 9/1952 | Swanson | 362/812 |
| 2,699,536 | 1/1955 | Roth et al. . | |
| 3,201,881 | 8/1965 | Dechar . | |
| 3,694,645 | 9/1972 | Brantz | 362/811 |
| 3,706,968 | 12/1972 | Turner, Jr. | 362/293 |
| 3,838,858 | 10/1974 | Tummescheit | 40/442 |
| 3,868,501 | 2/1975 | Barbour | 362/231 |
| 4,041,452 | 8/1977 | Moya . | |
| 4,323,879 | 4/1982 | Kelley . | |
| 4,742,439 | 5/1988 | Choate . | |
| 4,809,584 | 3/1989 | Forrest | 362/811 |
| 4,860,177 | 8/1989 | Simms . | |
| 4,875,143 | 10/1989 | Fernandez | 362/234 |
| 4,947,291 | 8/1990 | McDermott | 362/231 |
| 4,949,228 | 8/1990 | Lin et al. . | |

*Primary Examiner*—Y. Quach
*Attorney, Agent, or Firm*—James F. Harvey, III

[57] ABSTRACT

The present invention provides a safety light having a easily recognizable and colorful rotating illumination pattern. The safety light consists of a housing containing at least one group of secondary lighting elements arranged substantially around a primary lighting element. The lighting elements are covered by a translucent face having a central portion overlying the primary lighting element and a group of colored elements overlying each group of secondary lighting elements. Circuit means power the lighting elements such that the secondary lighting elements are illuminated in a rotating sequence, producing a distinct light pattern. The safety light is suitable for use in a wide variety of applications, including vehicles and recreational and service activities.

3 Claims, 2 Drawing Sheets

SAFETY LIGHT WITH COLORFUL ROTATING ILLUMINATION PATTERN

BACKGROUND OF THE INVENTION

1. Field of the Invention

This invention relates to safety lights for vehicles or other recreational or service applications. Such lights are useful in ensuring safe operation of the vehicle or participation in the recreational or service activity during hours of darkness. More specifically, the invention relates to safety lights which provide a distinctive illumination pattern which can be readily identified as associated with a particular user or activity.

2. Description of Related Art

The prior art discloses a number portable safety lights used in conjunction with a vehicle such as a bicycle. For example, Simms, U.S. Pat. No. 4,860,177 discloses a bicycle safety light with a variable LED pattern to improve nighttime recognition of the bicyclist. However, the Simms safety light is not multicolored, nor does the light energization sequence proceed in a distinctive easily recognizable rotating pattern. Furthermore, the intensity of a strictly LED display may unduly limit the distance at which the light can be recognized as emanating from a particular source. Such a single color limited illumination safety light might be easily confused with a common roadside reflector. Similar problems apply to the bicycle safety flasher described in Kelley, U.S. Pat. No. 4,323,879, and the single color bicycle signalling device of Lin et al., U.S. Pat. No. 4,949,228. The flasher is even more likely to be confused with other sources since it is commonly used in a number of stationary applications, for example as part of a highway or construction barricade.

Several types of illumination patterns exist in the prior art. For example, Roth, U.S. Pat. No. 2,699,536, discloses a safety light which generates a spiral pattern of variable color. However, Roth does not teach a simple method for generating a display with a pattern of continuously varying colors, and his light is not able to display several colors at once. The Roth light source, generating only a single color at any given time, could easily be confused with any number of other similar sources, such as streetlights, signal lights, headlights, or lights from emergency vehicles. The importance of rotation as a signalling means has been noted in Moya, U.S. Pat. No. 4,041,452. However, Moya relies upon a rotating housing surrounding a single fixed light source to create a swept beam of light, and does not vary the color or pattern of the source.

The patterns generated by the prior art devices are not unique or colorful, and are susceptible to confusion with other light generating or reflecting devices used in numerous unrelated applications. This confusion as to the source of the light tends to diminish its effectiveness as a safety or warning device, and thereby increases the likelihood that an accident will occur. In addition, many of the prior art devices are cumbersome and uninteresting and may deter certain people from using them, thereby increasing the risk of injury. For example, children may see the prior art safety devices as interfering with their recreational activities and therefore be less likely to use them.

Furthermore, none of the safety lights discussed above are suitable for a wide variety of applications. Many are suitable for use only with bicycles or similar vehicles, and cannot be easily modified to accommodate alternative uses. However, distinctive light sources are needed in a diverse array of applications, including but not limited to recreational activities. For example, a distinctive safety light would also be useful to those who provide delivery, maintenance and repair services during hours of darkness. These services might involve food delivery, plumbing and air-conditioning maintenance and repair, and the like. A particular service provider should be equipped with an appropriate safety light incorporating a distinctive pattern which protects their safety by announcing their presence to others. The prior art devices are not readily adaptable to such uses.

As is apparent from the above, there is presently a need for a distinctive safety light which is unlikely to be confused with other sources. The source should provide a colorful rotating pattern such that it can be readily identified with a particular use or activity. The basic safety light should be easily modified to provide a large number of distinctive illumination patterns. The safety light should thus be readily adaptable to a wide variety of different applications, including but not limited to vehicles, recreational activities and service providers.

SUMMARY OF THE INVENTION

The present invention discloses a safety light which consists of at least one group of secondary lighting elements arranged substantially around at least one primary lighting element. A translucent face having a central portion and at least one group of colored elements is provided such that certain of the lighting elements, when illuminated, appear to a viewer as a particular color. The safety light includes circuit means for illuminating the primary and secondary lighting elements, such that the secondary lighting elements are illuminated in a particular sequence. The safety light further includes a housing for the lighting elements, translucent face and circuit means.

In accordance with one aspect of the present invention, two groups of secondary lighting elements are arranged in a circle around the primary lighting element and are sequentially illuminated such that one group of secondary lighting elements appears to rotate in a clockwise direction around the primary lighting element while the other group of secondary lighting elements appears to rotate in the opposite direction.

As a feature of the present invention, a distinctive safety light is provided wherein the light pattern generated suggests that the source is emanating from a user involved with certain vehicles or activities, as opposed to a standard single or dual color reflector or beacon which conveys no such information. The safety light is suitable for a wide variety of applications, including but not limited to use on vehicles, in conjunction with recreational equipment or activities, or by service personnel. The safety light of the present invention produces a colorful rotating pattern which will allow for enhanced safety for those operating vehicles or participating in a variety of recreational and service activities during hours of darkness.

As another feature of the present invention, the safety light is designed such that the light emanating therefrom conforms to typical statutory requirements regarding safety lights and the intensity thereof.

As an additional feature of the present invention, the safety light is suitable for mounting on a variety of vehicles, including but not limited to bicycles, scooters, boats, mopeds, motorcycles, off-road vehicles, trucks and automobiles. The safety light may be used with many different types of mounting means, including but not limited to brackets, straps, magnets, adhesives and weighting devices. The safety light is lightweight, weather-proof, and suitable for use as either a warning light or an emergency light.

As yet another feature of the present invention, alternative embodiments of the device are suitable for use apart from a vehicle, as with jackets or headgear for service personnel, joggers or children playing outside. The safety light of the present invention is readily modified such that a variety of distinctive illumination patterns can be produced, each capable of indicating a particular activity.

As a further feature of the present invention, the illumination pattern is such that participants in evening recreational activities will see the safety light as an interesting and fun enhancement to their activity rather than as a cumbersome safety device, and thereby be more likely to use it.

The above-discussed features and attendant advantages of the present invention will be come better understood by reference to the following detailed description of the invention and the accompanying drawings.

DETAILED DESCRIPTION OF THE PREFERRED EMBODIMENTS

The present invention provides a safety light which is capable of providing a wide variety of distinctive and colorful illumination patterns. It should be understood that the following detailed description, although directed primarily to certain preferred embodiments of the present invention, also discloses general techniques which can be readily adapted to produce alternative patterns.

Figure 1:
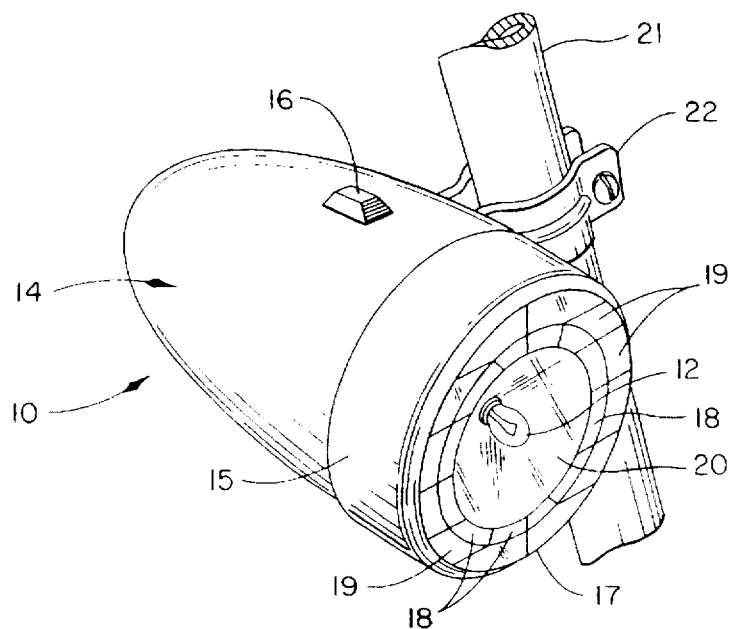
FIG. 1 is a view of a preferred embodiment of the safety light of the present invention for use with a vehicle such as a bicycle.

FIG. 1 illustrates a preferred embodiment of the present invention suitable for mounting on a vehicle. The safety light 10 comprising the present invention includes a centrally located primary lighting element 12 as well as additional lighting elements to be discussed in greater detail below. The safety light 10 is contained within a housing 14 which includes a cover 15. Housing 14 is lightweight and weatherproof, constructed of plastic or other suitable material. Housing 14 with cover 15 further provides an enclosure into which batteries may be placed for powering the lighting elements and related circuitry as will be further discussed below. Alternatively, safety light 10 could include a variety of other powering means commonly used in the art, such as external hookup to a generator engaging the wheel of a bicycle or to an adaptor for a vehicle cigarette lighter. Housing 14 includes a mounting bracket 22 for mounting to vehicle frame 21. Alternative mounting means, including but not limited to brackets, straps, magnets, adhesives or weighting devices could be used as appropriate for a particular application. For example, in an automotive application, the housing could include a magnetic or adhesive mounting means to permit the safety light to be securely mounted to the top, side or even the underside of the automobile. Housing 14 further includes a switch 16 which is operative to supply power from the powering means to the lighting elements of safety light 10.

Housing cover 15 has a translucent face 17 constructed of glass, plastic, film or other translucent material. Translucent face 17 includes a central portion 20, and a first group 18 and a second group 19 of colored elements. Central portion 20 is also colored but could be uncolored in an alternative embodiment. When the light produced by underlying primary lighting element 12 and other lighting elements within safety light 10 passes through translucent face 17 and the colored elements or portions thereof, the light will appear to take on the color of the overlying portion of translucent face 17. Alternatively, the color could be produced by the lighting elements themselves, without the use of a colored translucent face. In such an embodiment, the lighting elements could be colored bulbs, colored LEDs, or other lighting elements capable of generating light of a particular color.

Figure 2:
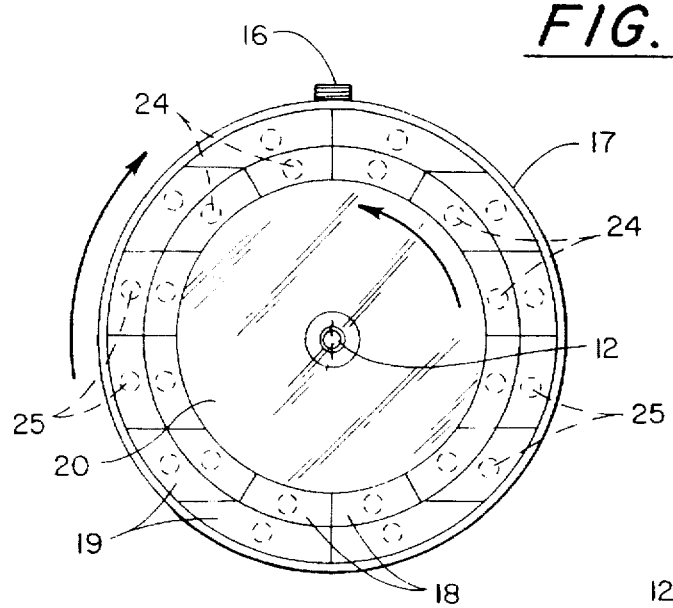
FIG. 2 is a view of a preferred embodiment of the face of the safety light.

Additional detail regarding the lighting elements of safety light 10 is shown in FIG. 2. A first group of several secondary lighting elements 24 surrounds the primary lighting element 12 in a circular arrangement. A second group of secondary lighting elements 25 surrounds the first group adjacent the periphery of translucent face 17. These lighting elements could be bulbs, LEDs or any other suitable light-generating means. As was previously described, face 17 is formed of a variety of colored elements. First and second groups of secondary lighting elements 24, 25 are covered by first and second groups of colored elements 18, 19 respectively. In the preferred embodiment of FIGS. 1 and 2 each colored element in groups 18, 19 of translucent face 17 corresponds to and covers a single underlying secondary lighting element of groups 24, 25. The light generated by each of the underlying secondary elements is therefore externally viewed in the color of the overlying colored element of translucent face 17.

The central portion 20 of translucent face 17, overlying primary lighting element 12, preferably consists of a translucent material that will impart a single color to the light emanating from primary lighting element 12. Primary lighting element 12 will generally be illuminated continually or in a blinking or pulsating fashion. Primary lighting element 12 thus provides a means for generating a light signal of sufficient intensity to ensure that safety light 10 is generally compliant with typical statutory regulations regarding safety lights for use on bicycles and other vehicles. The groups of secondary lighting elements 24, 25 serve to provide the distinctive illumination pattern of safety light 10.

The operation of the groups of secondary lighting elements 24, 25 is as follows. Secondary lighting elements 24, 25 are energized in a sequence that provides an external viewer with a unique and colorful pattern whereby the user of the source can be readily recognized as associated with a particular activity. In the preferred embodiment of FIG. 2, this unique pattern involves sequentially energizing the first group of secondary lighting elements 24 in a counterclockwise direction, while simultaneously energizing the second group of secondary lighting elements 25 in a clockwise direction. The result appears to the viewer as two light sources rotating about the central primary element 12, and varying in color as a function of the position of the currently illuminated secondary lighting element. The direction of apparent rotation is as shown by the arrows in FIG. 2. Each of the colored elements of first and second groups of elements 18, 19 could be a different color, or a few colors could be repeated in a desired pattern.

A similar rotating light source effect could be produced by providing two physically rotating light sources traveling in opposite directions about the central lighting element. As the sources rotated past the various colored elements of translucent face 17, the viewer would experience the same rotating colorful pattern as that produced when there is a sequential energizing of individual light elements underlying each colored element of face 17.

Figure 3:
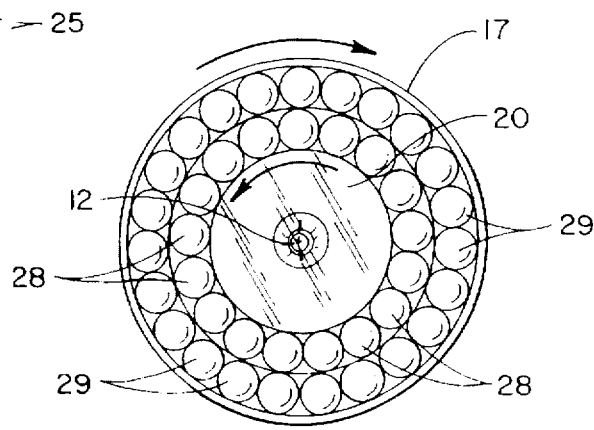
FIG. 3 is an alternative embodiment of the face of the safety light.
Figure 4:
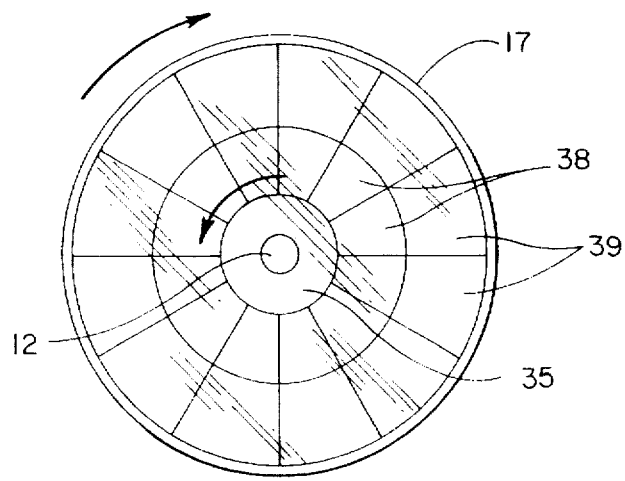
FIG. 4 shows another alternative embodiment of the face of the safety light.

Alternate arrangements of colored elements making up translucent face 17 of safety light 10 are shown in FIGS. 3 and 4. Both arrangements illustrate variations in the safety light 10 resulting from changes in the shape and distribution of the colored elements of the translucent face 17. In the embodiment shown in FIG. 3 a first group of colored elements 28 is arranged around central portion 20 of face 17. A second group of colored elements 29 surrounds first group 28. In FIG. 4 an arrangement which uses fewer colored elements is shown. The colored elements 38 of the first group surround central portion 35 and are in turn surrounded by the second group 39. As was mentioned above, each of the colored elements could be a different color, or any desired pattern of several repeated colors could be used. A very large number of distinctive colorful patterns could be generated.

In FIGS. 3 and 4, the illumination of the underlying secondary lighting elements is in the direction indicated by the arrows. The directions could also be reversed from the arrangement shown, or the circuit means could alternate the apparent direction of rotation for a given group of secondary lighting elements. The underlying secondary lighting elements may change in shape and arrangement to correspond to the alternate translucent face arrangements shown in FIGS. 3 and 4. For example, each of the colored elements in the first and second groups of colored elements could have a separate secondary lighting element underlying it. Alternatively, an arrangement of secondary lighting elements similar to that shown in FIG. 2 could be used. Each colored element of the translucent face need not have its own underlying secondary lighting element.

Although the preferred embodiments discussed herein show secondary lighting elements 24, 25 which are smaller in size and intensity than the centrally located primary lighting element 12, the secondary lighting elements could be made as large as or larger than the primary element. In addition, the embodiments shown use a centrally located primary lighting element. A similar effect could be obtained by locating the primary lighting element 12 elsewhere on the face and substantially but not completely surrounding it with secondary lighting elements. Other variations could be obtained by using a single group of secondary lighting elements and colored elements, or by using three or more groups with appropriate variation in apparent rotation between groups.

Figure 5:
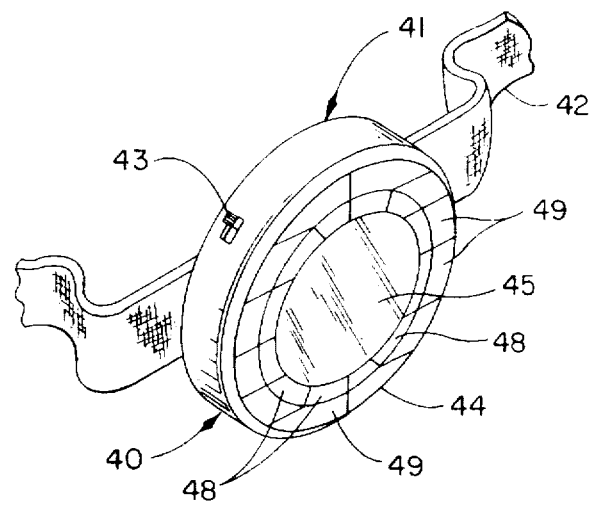
FIG. 5 shows the safety light using an alternative housing suitable for use in non-vehicular activities.

An alternative embodiment of the safety light of the present invention is shown in FIG. 5. This particular embodiment is not mounted to a vehicle but is instead strapped to or otherwise worn by the user. In FIG. 5, safety light 40 includes a housing 41 having an adjustable strap 42 such that light 40 may be quickly and easily attached around a user's waist, arm or leg. Housing 41 in this embodiment is designed such that safety light 40 will not be bulky or cumbersome, thereby minimizing interference with user activity. Safety light 40 also includes a power switch 43 and translucent face 44. As in previous embodiments, translucent face 44 includes a central portion 45, a first group of colored elements 48 and a second group of colored elements 49.

In another variation, housing 41 could include a string or the like in place of strap 42 such that safety light 40 could be worn around the neck of a user. Another possible variation is to incorporate safety light 40 into hats, headbands, jackets and other apparel worn by those engaged in evening outdoor recreational or service activities. The housing 41 would be suitably modified to accommodate these alternative embodiments.

Figure 6:
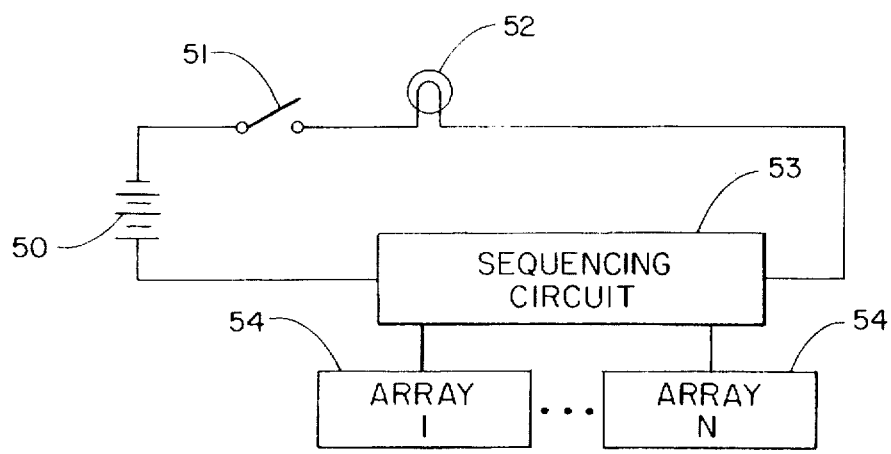
FIG. 6 is a schematic diagram of an exemplary circuit means for illuminating the safety light of the present invention.

Each of the exemplary embodiments described above includes appropriate circuit means for illuminating and sequencing lighting elements of the safety light. An exemplary powering and sequencing circuit is shown in FIG. 6. Battery 50 supplies the necessary power to the circuit. Switch 51 applies a suitable current and voltage from battery 50 to primary lighting element 52 and sequencing circuit 53. Sequencing circuit 53 provides appropriate signals to the secondary lighting elements. Each array 54 driven by sequencing circuit 53 corresponds to a group of secondary lighting elements. The specific details of sequencing circuit 53 will vary depending upon the type of illumination sequence or pattern desired.

It will be understood by those skilled in the art that many additional modifications may be made in the illumination circuitry and sequence, the shape and arrangement of the primary and secondary light sources, the number and type of colors, the housing and mounting means, and other features of the present invention, without deviating from the spirit and scope of the invention which is limited only by the appended claims.

What is claimed is:

1. A safety light comprising:

at least one primary lighting element for directing light energy outward in a particular direction;

at least one group of secondary lighting elements arranged substantially around said primary lighting element for directing light energy outward in said particular direction, wherein at least one group of secondary lighting elements comprises at least one secondary lighting element rotatably mounted within said safety light so as to permit rotation of said secondary lighting element about said primary lighting element;

a translucent face lying substantially on a plane perpendicular to said particular direction comprising a central portion overlying said primary lighting element and at least one group of colored elements, each color element of said at least one group of colored elements overlying each secondary lighting element of said at least one group of secondary lighting elements, such that when said secondary lighting elements are illuminated, light emitting from said secondary lighting element appears to a viewer in a color corresponding to one of said colored elements;

circuit means for illuminating said primary lighting element and said secondary lighting elements, said secondary lighting elements being illuminated in a particular sequence; and housing means for housing said lighting elements, said translucent face and said circuit means of said safety light.

2. The safety light of claim 1 wherein a first rotating secondary lighting element rotates about said primary lighting element while at least one other secondary lighting element rotates around said first rotating secondary lighting element.

3. A safety light comprising:

a central primary lighting element for directing light energy outward in a particular direction;

a first group of secondary lighting elements arranged substantially around said primary lighting element for directing light energy outward in said particular direction;

a second group of secondary lighting elements arranged substantially around said first group of secondary lighting elements for directing light energy outward in said particular direction, wherein each of said groups of secondary lighting elements comprises at least one secondary lighting element rotatably mounted within said safety light so as to permit rotation of said secondary lighting element about said primary lighting element;

a translucent face lying substantially in a plane perpendicular to said particular direction comprising a central poriton overlying said primary lighting element and a first and second group of colored elements, said first group of colored elements overlying said first group of secondary lighting elements, and said second group of colored elements overlying said second group of secondary lighting elements, such that when said secondary lighting elements are illuminated, light emitting from each of said secondary elements appears to a viewer in a color of one of said colored elements;

circuit means for illuminating said primary lighting element and said secondary lighting elements, said first and second groups of secondary lighting elements being illuminated in a particular sequence; and housing means for housing said primary and secondary lighting elements, said translucent face and said circuit means of said safety light.

* * * * *